United States Patent
Calvet et al.

(10) Patent No.: US 8,736,950 B2
(45) Date of Patent: *May 27, 2014

(54) MEMS DEPLOYMENT FLEXURES

(71) Applicants: Robert J. Calvet, Arcadia, CA (US); Roman C. Gutierrez, Arcadia, CA (US); Xiaolei Liu, Arcadia, CA (US); Ankur Jain, Arcadia, CA (US)

(72) Inventors: Robert J. Calvet, Arcadia, CA (US); Roman C. Gutierrez, Arcadia, CA (US); Xiaolei Liu, Arcadia, CA (US); Ankur Jain, Arcadia, CA (US)

(73) Assignee: DigitalOptics Corporation MEMS, Arcadia, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/652,159

(22) Filed: Oct. 15, 2012

(65) Prior Publication Data
US 2013/0036592 A1   Feb. 14, 2013

Related U.S. Application Data

(60) Division of application No. 12/273,785, filed on Nov. 19, 2008, now Pat. No. 8,289,614, which is a continuation of application No. 12/201,635, filed on Aug. 29, 2008, now abandoned.

(60) Provisional application No. 60/968,706, filed on Aug. 29, 2007.

(51) Int. Cl.
*G02B 26/00* (2006.01)
*G02B 26/08* (2006.01)

(52) U.S. Cl.
CPC .................................. *G02B 26/0841* (2013.01)
USPC .......................................... 359/291; 359/290

(58) Field of Classification Search
USPC .................................................. 359/290, 291
See application file for complete search history.

(56) References Cited

U.S. PATENT DOCUMENTS 7,027,206 B2   4/2006   Mochizuki
8,289,614 B1 * 10/2012   Calvet et al. ................... 359/291

* cited by examiner

*Primary Examiner* — Jack Dinh
(74) *Attorney, Agent, or Firm* — Haynes and Boone, LLP

(57) ABSTRACT

A flexure assembly can have a stage that is deployed to a desired position by attachment of the flexure assembly to a housing. For example, a frame can be configured to be held in position by one portion of the housing and a deployment pad can be configured to be held in position by another portion of the housing. A deployment flexure can be configured to facilitate positioning of the frame and the deployment pad out-of-plane with respect to one another. The deployment flexure and a motion control flexure can facilitate movement of the stage with respect to the housing. In this manner, the position of the stage and the preload of the stage are determined by the housing.

10 Claims, 6 Drawing Sheets

US 8,736,950 B2

MEMS DEPLOYMENT FLEXURES

PRIORITY CLAIM

This patent application is a divisional of U.S. patent application Ser. No. 12/273,785 filed Nov. 19, 2008, which is a continuation patent application of U.S. patent application Ser. No. 12/201,635 filed on Aug. 29, 2008, which claims priority to and the benefit of U.S. Provisional Patent Application No. 60/968,706 filed Aug. 29, 2007. The entire contents of both of these regular patent applications and the provisional patent application are hereby expressly incorporated by reference.

TECHNICAL FIELD

The present invention relates to micro electromechanical systems (MEMS). The present invention relates more particularly to MEMS flexures that utilize packaging for deployment and that can be soft in multiple degrees of freedom.

BACKGROUND

Flexures for use in micro electromechanical system (MEMS) are known. Such flexures typically allow movement in one direction while inhibiting movement in other directions or about any axis. Thus, such flexures can facilitate the controlled movement of one structure or device relative to another structure or device.

BRIEF SUMMARY

According to an example of an embodiment, a flexure assembly can comprise one or more flexures and a stage. The stage and/or flexures can be deployed to a desired position by attachment to a package, housing, or other structure. Thus, a desired position of the stage can be defined during assembly of a product.

According to an example of an embodiment, housing for a flexure can comprise structures that are configured so as to deploy the flexure to a desired position when the flexure is attached to a housing. Such structures can define the positions of portions of the flexure and/or structures attached to the flexure when the flexure is in the deployed configuration thereof.

According to an example of an embodiment, a device can comprise a flexure assembly comprising a flexure and a stage. The stage can be deployed to a desired position by attachment of the flexure assembly to a housing. The housing can be configured so as to deploy the stage to a desired position when the flexure assembly is attached to the housing.

According to an example of an embodiment, a flexure can comprise a deployment pad and at least one flexure formed to the deployment pad. The position of the deployment pad can be defined by structures of a housing during assembly of a product. The position of the deployment pad can at least partially determine the position of a stage or other item.

According to an example of an embodiment, a lens assembly can comprise a flexure assembly and the flexure assembly can comprise a flexure and a stage. The stage can be deployed to a desired position by attachment to a housing. The lens assembly can further comprise at least one lens attached to the stage.

According to an example of an embodiment, a camera can comprise a lens assembly wherein the lens assembly comprises a flexure assembly. The flexure assembly can comprise a flexure and a stage. The stage can be deployed to a desired position by attachment to a housing. The lens assembly can comprise at least one lens attached to the stage.

According to an example of an embodiment, a personal electronic device can comprise a camera. The camera can comprise a lens assembly. The lens assembly can comprise at least one lens attached to the stage. The position of the stage can be defined by the position of a flexure during assembly.

According to an example of an embodiment, a method can comprise deploying a flexure during packaging of the flexure. The flexure and/or flexure assembly can be substantially flat, e.g., planar, during manufacture, shipping, storage, and handling thereof, as well as during some portion of assembly of the device within which the flexure is used. Then, the flexure is deployed during assembly of the device to define a non-flat configuration thereof.

Embodiments of the present invention will be more fully understood in conjunction with the following detailed description taken together with the following drawings.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
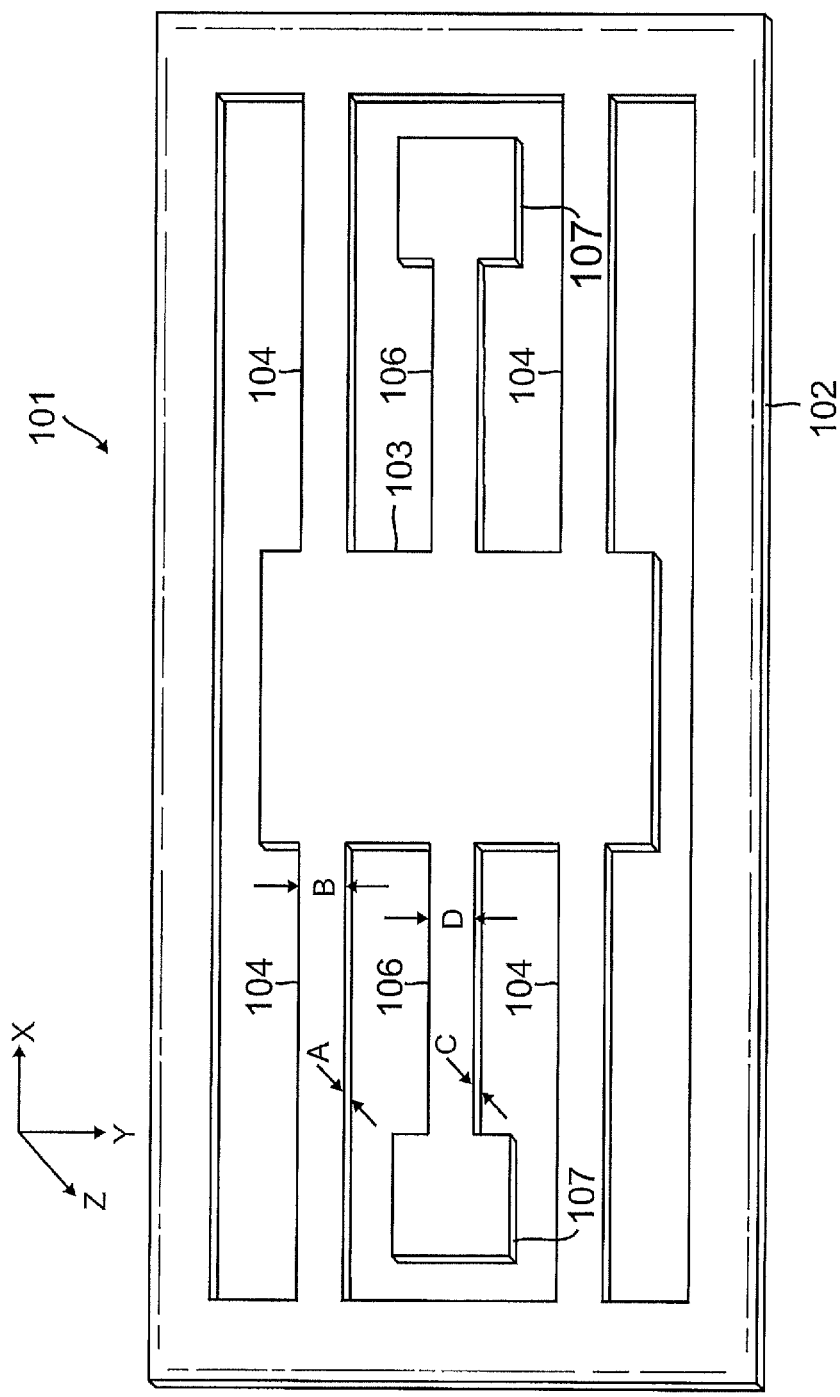
FIG. 1 is a semi-schematic perspective view of a flexure assembly, according to an example of an embodiment.

A method and system for deploying a flexure assembly are disclosed. The flexure assembly can be suitable for use in devices such as a miniature camera, such as those commonly used in cellular telephones and the like.

In some applications, a motion stage must be displaced for use thereof. For example, in a miniature camera a stage must sometimes be displaced to its infinity focus position in order to facilitate desired operation of the camera. According to an embodiment, packaging displaces a portion of a die (which defines the flexure assembly) to a known height that is out-of-plane with respect to the rest of the flexure assembly. This portion is connected elastically to the motion stage and applies a known force to the stage, displacing it out-of-plane to a calculated equilibrium position.

Alternatively, the displaced portion of the die can be displaced in-plane. Indeed, any desired combination of in-plane and out-of-plane displacement can be used.

A flexure assembly can be deployed so as to configure, e.g., displaced, the flexures thereof as required for use. For example, a flexure assembly can facilitate desired positioning of optics in a miniature camera system. In order for the flexure assembly to properly position the optics, the flexures must have desired positions, deformations, and/or preloads.

Such displacement can be accomplished without substantially affecting the performance of the stage in an adverse manner. This implies displacement by applied force, through a flexure assembly. To not affect the performance of the stage, the deployment flexure should apply only the force required, with minimal extraneous forces in other directions, and should not add any significant stiffness to the motion direction of the stage system.

One or more examples of embodiments make deployment a substantially transparent operation. That is, deployment of the flexure assembly occurs during normal assembly. Thus, no extra process step is required. In this manner, assembly is simplified and costs are reduced. Also, more consistent and reliable deployment can be obtained.

Generally, applying a precise displacement in order to create a precise force according to contemporary methodology is difficult. Tolerances of plastic parts are not high compared to requirements for the stage, and assembly errors may induce motion in other degrees of freedom. If the deployment flexure has low stiffness compared to the stage, then any displacement applied to the end of the deployment flexure results in a much smaller displacement to the stage—with positional error reduced by the ratio of stiffness. This aids in both a more accurate deployment position and less sensitivity to extraneous lateral displacements of the deployment contact point.

According to contemporary micro electromechanical systems (MEMS) methodology, deployment is accomplished by a variety of methods that usually involve external manipulators to push and lock the deployment structures to the parent silicon die. The application of bulk high inertial accelerations is sometimes used to create enough force for deployment and lock. However, as those skilled in the art will appreciate, such procedures are complicated, time consuming, costly, unreliable, and provide inconsistent results.

According to one or more examples of embodiments, deployment occurs during packaging, thereby eliminating a separate deployment step. Such deployment provides a correct disposition of stiffness degrees of freedom.

According to one or more examples of embodiments, raised deployment features of the housing contact deployment pads and push them out-of-plane during assembly. That is, one or more structures of the housing cause the flexure assembly to deform in a manner that positions components of the flexure assembly as required for proper operation thereof.

Stretching the deployment flexure produces a force on the moving stage and pulls it out-of-plane to an equilibrium position that depends on the ratio of stiffness between the deployment flexures and the motion control flexures.

Some miniature camera actuators require deployment that results in an infinity focus position. The infinity focus position may be at ~100 microns from the imager, for example.

This position should be obtained as precisely as possible. Any lateral motion of the deployment flexure may cause a lateral deflection of the motion control proportional to the ratio of stiffness. The allowable lateral deflection can be about 100 nanometers, for example.

The stiffness of the deployment flexure can be either equal to or less than the motion control stiffness in the travel direction (which can be about 12 N/m). If equal, the total distance the deployment pads move is twice the stage motion. This results in errors in the final deployment pad position that are halved at the stage position. If the deployment flexure stiffness is less than the motion control stiffness, the reduction in stage position error is correspondingly greater.

The deployment flexure can be substantially softer in the lateral directions than the motion control. Possible lateral position errors due to assembly could be as high as 50 microns. When ratioed to 100 nm allowable lateral stage motion, this means the deployment flexure must have a lateral stiffness less than $\frac{1}{500}$ of the motion control. Fortunately, the motion control needs to be quite stiff laterally (about 65,000 N/m), so this requirement is not that difficult to meet (130 N/m).

Attachment of the flexure assembly to the package can be accomplished without undesirably altering the position of the moving part (such as in the x and y axes). Indeed, such attachment can define the desired positioning of the part.

Thus, a generally planar flexure assembly can have portions thereof that are urged out-of-plane by the housing (such as by the housing of a miniature camera) so as to result in a desired configuration of the flexure assembly. This desired configuration of the flexure assembly can have predetermined positions, deformations, and/or preloads.

According to an example of an embodiment, a flexure assembly can comprise a flexure and a stage. The stage can be deployed to a desired position by attachment to a housing. For example, the desired position can be a position that results in infinity focus for a camera.

The flexure can be a MEMS flexure, for example. The flexure can be formed used MEMS fabrication techniques. For example, the flexure can be etched from silicon to form a die using well know techniques. The flexure can be used in MEMS applications. For example, the flexure can be used to control the motion of MEMS structures and/or devices.

The flexure can be configured so as to be deformed by structures of the housing. The flexure can be generally planar in configuration prior to being attached to the housing. The flexure can be configured so as to be deformed by structures of the housing in a manner that moves a portion of the flexure out-of-plane.

The flexure assembly can comprise a frame, a deployment flexure formed to the stage, a deployment pad formed to the deployment flexure, and a motion control flexure interconnecting the frame and the stage.

The flexure assembly can comprise a frame that is configured to be positioned by a portion of the housing, a deployment pad that is configured to be positioned by another portion of the housing, and a deployment flexure configured to facilitate positioning of the frame and the deployment pad out-of-plane with respect to one another. The flexure can comprise a motion control flexure. The deployment flexure and the motion control flexure can facilitate movement of the stage with respect to the housing.

The flexure, such as the motion control flexure, can be comparatively soft in one degree of freedom. The flexure, such as the deployment flexure, can be comparatively soft in a plurality of degrees of freedom.

According to an example of an embodiment, a housing for a flexure can comprise structures that are configured so as to deploy the flexure to a desired position when the flexure is attached to the housing.

The structures can comprise at least one first member for positioning a frame of a flexure assembly and at least one second member for positioning a deployment pad of the flexure assembly. The structures can comprise at least one first member for positioning a frame of a flexure assembly and at least one second member for position a deployment pad of the flexure assembly. Such positioning of the frame and deployment pad can result in desired position and/or preload of a stage of the flexure assembly.

According to an example of an embodiment, a device can comprise a flexure assembly comprising a flexure and a stage. The stage can be deployed to a desired position by attachment of the flexure assembly to a housing. A housing can be configured so as to deploy the stage to a desired position when the flexure assembly is attached to the housing.

According to an example of an embodiment, a flexure assembly can comprise a deployment pad and at least one flexure formed to the deployment pad. Any desired number of deployment pads can be attached to any desired number of flexures.

The flexure(s) can comprise at least one loop flexure. The flexure(s) can comprise at least one loop flexure that is locally soft in bending and extension. The flexure(s) comprise a strut having at least one loop flexures disposed at both ends thereof.

The flexure(s) comprise at least one serpentine flexure. The flexure(s) comprise at least one serpentine flexure that is soft in all directions. Any desired combination of loop flexures and serpentine flexures can be used.

According to an example of an embodiment, a lens assembly can comprise a flexure assembly comprising a flexure and a stage. The stage can be deployed to a desired position by attachment to a housing. The lens assembly can further comprise at least one lens attached to the stage.

According to an example of an embodiment, a camera can comprise a lens assembly wherein the lens assembly comprises a flexure assembly. The flexure assembly can comprise a flexure and a stage. The stage can be deployed to a desired position by attachment to a housing. The lens assembly can comprise at least one lens attached to the stage.

According to an example of an embodiment, a personal electronic device can comprise a camera. The camera can comprise a lens assembly. The lens assembly can comprise at least one lens attached to the stage.

The personal electronic device can comprise a cellular telephone. Alternatively, the personal electronic device can comprise a personal digital assistant (PDA), laptop computer, palmtop computer, or any other device.

According to an example of an embodiment, a method can comprise deploying a flexure during packaging of the flexure.

Deployment can result in a desired stiffness in the degree of freedom in which movement is allowed. Deployment results in a desired stiffness in all degrees of freedom.

Figure 2:
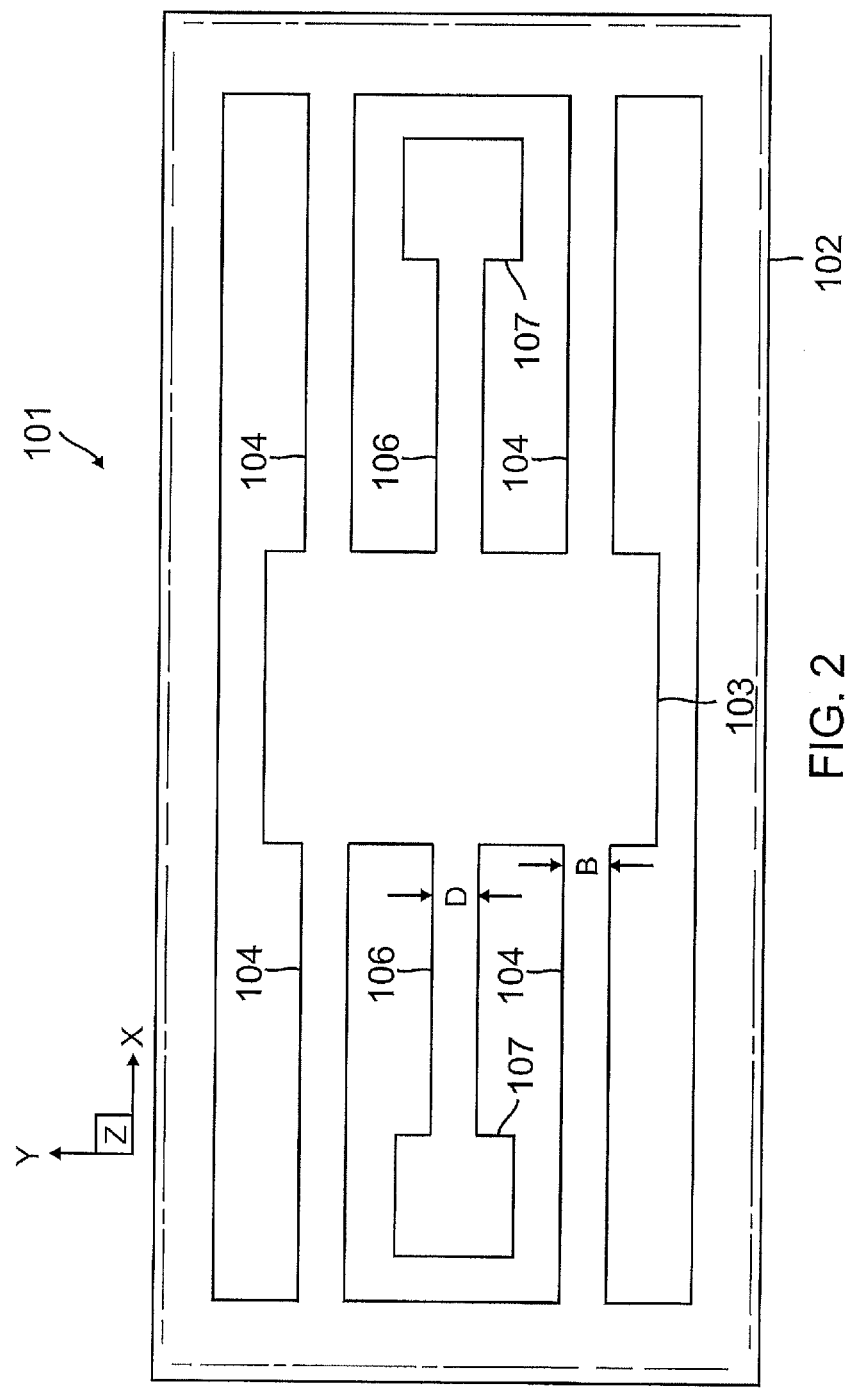
FIG. 2 is a semi-schematic top view of a flexure assembly, according to an example of an embodiment.

Referring now to FIGS. 1 and 2, a flexure assembly 101 can comprise a frame 102 and a stage 103. The frame 102 can be generally stationary with respect to a device with which the flexure assembly 101 is used and the stage 103 can move with respect to the device. Generally, the stage 103 will move readily with respect to the frame 102 (as thus with respect to the device) along one axis and will be at least somewhat constrained in motion along or rotation about other axes.

For example, the stage 103 can be configured to move along the z axis. The stage 103 can be configured to be constrained in movement along and about the x axis and the y axis. Thus, the stage 103 can be allowed to move in and out of the plane of the paper in FIG. 2 while be constrained or substantially limited with respect to movement within the plane of the paper.

One or more motion control flexures 104 can interconnect the stage 103 and the frame 102. The motion control flexures 104 can be configured so as to facilitate translation of the stage 103 in the desired direction, e.g., along the z axis, and can be configured so as to inhibit translation along the other axes, e.g., along the x axis and the y axis, and to inhibit rotation about all axes, i.e., the x axis, the y axis, and the z axis.

Generally, the motion control flexures 104 can be made to facilitate such movement and to inhibit such movement by configuring the motion control flexures 104 such that their thickness, Dimension A, is substantially less than their width, Dimension B. Due to such configuration, the motion control flexures 104 are much stiffer (and thus more resistant to bending) in the direction of the y axis than in the direction of the z axis.

One or more deployment flexures 106 can interconnect deployment pads 107 and the stage 103. Like the motion control flexures 104, the deployment flexures 106 can be configured so as to facilitate translation of the stage 103 in the desired direction, i.e., along the z axis, and can be configured so as to inhibit translation along the other axes, i.e., along the x axis and the y axis, and to inhibit rotation about all axes, i.e., the x axis, the y axis, and the z axis.

The deployment flexures 106 can be configured so as to effect deployment of the stage 103 while also having little affect upon movement of the stage 103 after deployment. In particular, the deployment flexures 106 can be configured so as to have little effect upon movement of the stage 103 along the z-axis after deployment, at least for a limited range of motion.

Generally, the deployment flexures 106 can be made to facilitate such movement and to inhibit such movement by configuring the motion control flexures 104 such that their thickness, Dimension C, is substantially less than their width, Dimension D. Due to such configuration, the deployment flexures 106 are much stiffer (and thus more resistant to bending) in the direction of the y axis than in the direction of the z axis.

The deployment pads 107, like the frame 102, are held generally stationary by the housing once the device is assembled. Features or protrusions of the housing can facilitate such holding.

Typically, the deployment pads 107 will be at a different height with respect to the frame 101 when the device is assembled. Thus, the deployment pads will typically be out-of-plane with respect to the frame 102. Typically, the stage 103 will be at a height that is between that of the deployment pads 107 and the frame 102. Thus, the stage 103 will typically be out-of-plane with respect to both the frame 102 and the deployment pads 107.

The flexure assembly 101 can be made by using a MEMS process. For example, the flexure assembly 101 can be made of silicon and can be formed by etching the silicon. The flexure assembly 101 can define a MEMS device or a portion of a MEMS device. The flexure assembly 101 can be used with MEMS devices, such as to position a MEMS device.

Figure 3:
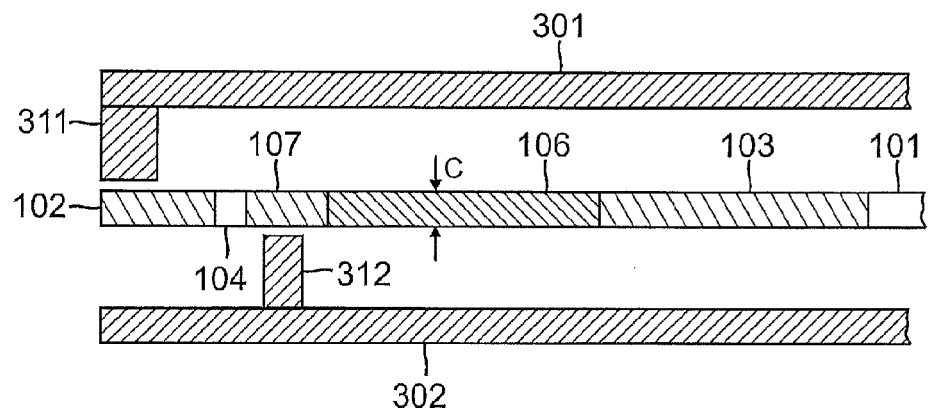
FIG. 3 is a semi-schematic cross-sectional side view of a flexure assembly disposed intermediate two housing sections, such as just prior to attaching the two housing section together and capturing the flexure assembly there between, according to an example of an embodiment.

Referring now to FIG. 3, the flexure assembly 101 is shown disposed between an upper housing section 301 and a lower housing section 302. The upper housing section 301 and the lower housing section 302 are separated from one another, such as prior to assembly of a housing therefrom. When the upper housing section 301 and the lower housing section 302 are brought together, the flexure assembly 101 is captured there between. When the upper housing section 301 and the lower housing section 302 are brought together, the flexure assembly is deformed so as to be deployed.

Figure 4:
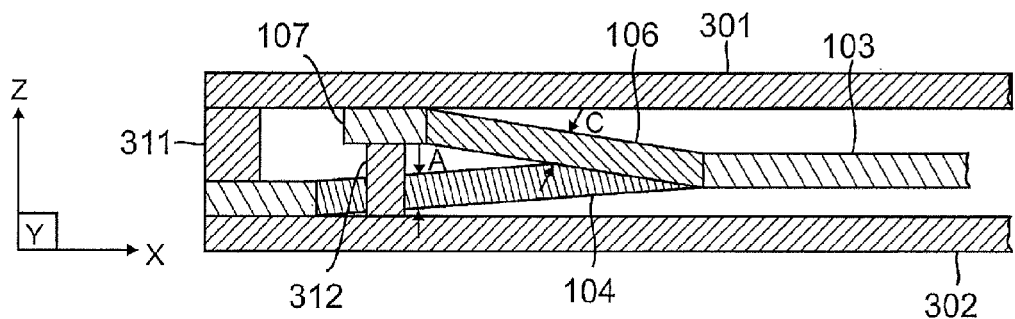
FIG. 4 is a semi-schematic cross-sectional side view of a flexure assembly captured between two housing sections and deployed, according to an example of an embodiment.

Referring now to FIG. 4, the upper housing section 301 and the lower housing section 302 have been brought together so as to define a housing. In bringing the upper housing section 301 and the lower housing section 302 together, a protrusion 311 of the upper housing section 301 and a protrusion 312 the lower housing section 302 are moved toward the flexure assembly 101 so as to effect deployment thereof.

More particularly, as the upper housing section 301 and the lower housing section 302 are brought together, protrusion 311 of the upper housing section 301 abuts the frame 102 of the flexure assembly 101 and protrusion 312 of the lower housing section 302 abuts the deployment pad 107 of the flexure assembly 101. When the upper housing section 301 and the lower housing section 302 are in their assembled positions, as shown in FIG. 4, then the motion control flexure 104 and the deployment flexure 106 are deformed so as to effect deployment of the flexure assembly 101.

When the flexure assembly 101 is deployed, then the stage 103 thereof is disposed at a desired position. In this instance, the stage 103 is disposed about half way between the upper housing section 301 and the lower housing section 302. Thus, attachment of the flexure assembly 102 to the housing (the upper housing section 301 and the lower housing section 302) effected deployment of the flexure assembly 102.

Although the stage 103 is shown in FIG. 4 and discussed above as being about half way between the upper housing section 301 and the lower housing section 302 when deployed, those skilled in the art will appreciate that the stage 103 can be at other positions when deployed. Indeed, the stage 103 need not even be within the housing when deployed.

Figure 5:
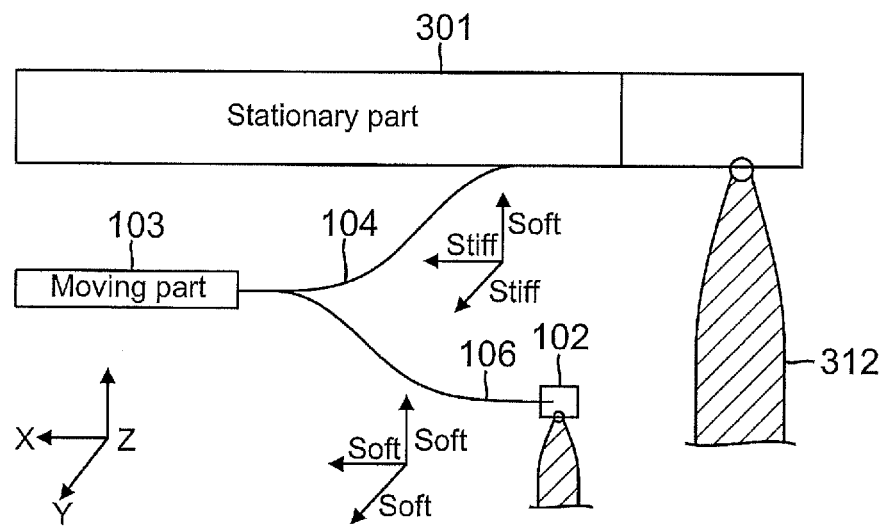
FIG. 5 is a schematic view of a deployed flexure assembly, according to an example of an embodiment.

Referring now to FIG. 5, a schematic diagram shows some of the structures of the flexure assembly and the housing. The diagram also shows the directions in which the deployment flexures 106 and the motion control flexures 104 are soft (readily movable) and stiff (inhibit movement).

A moving input is provided at the stage 103. The moving input is a force, such as from an actuator or motor, that tends to cause the stage 103 to move. For example, the moving input can be a force applied to a stage by an actuator that move the non-stage so as to position a lens assembly attached to the stage in a manner that focuses a camera.

The motion control flexures 104 can be soft in the direction of desired motion, i.e., along the z axis, and are stiff in all other directions, i.e., along the x axis and the y axis. The deployment flexures 106 can be soft along all axes, i.e., along the x, y, and z axes.

Various different combinations of soft and stiff directions can be achieved by using different configurations of the motion control flexures 104 and/or the deployment flexures 106. For example, the thickness and/or width of the motion control flexures 104 and/or the deployment flexures 106 (Dimensions A, B, C, and D) can be varied so as to provide the desired softness and stiffness, according to well-known principles.

Figure 6:
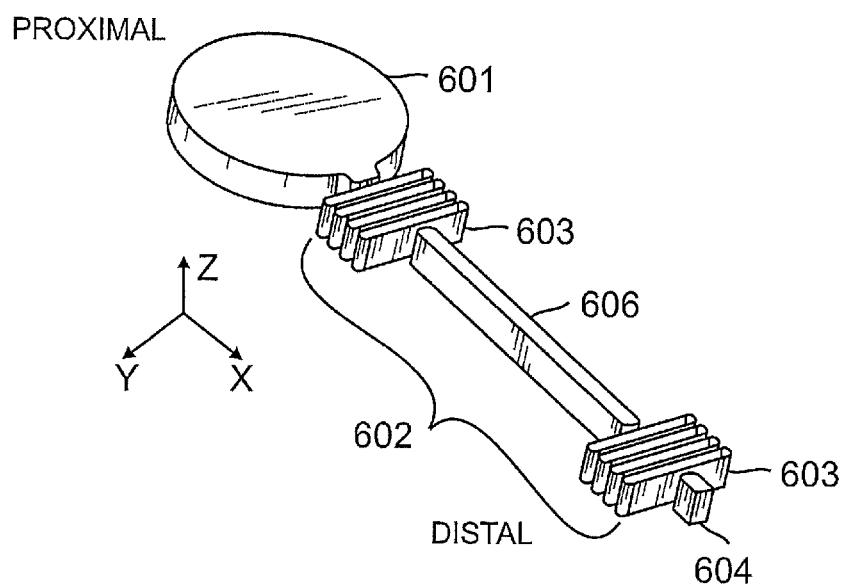
FIG. 6 is a semi-schematic perspective view of a deployment pad and deployment flexure wherein the deployment flexure comprises loop flexures, according to an example of an embodiment.

Referring now to FIG. 6, a deployment pad 601 and its associated deployment flexure 602 are shown, according to an example of an embodiment. The deployment pad 601 can be generally round (as shown), rectangular, square, octagonal, or of any other desired shape. The distal end of the deployment flexure 602 defines an attachment point 604, such as where the deployment flexure 602 can attach to a stage.

The deployment flexure 602 can comprise one or more loop flexures 603. For example, the deployment flexure 602 can have loop flexures 603 formed at either end thereof (as shown). The loop flexures 603 can be positioned at any desired location along the length of the deployment flexure 602 and can be positioned along the entire length thereof.

A substantially rigid beam link 606 can be provided intermediate the deployment pad 601 and the attachment 604. For example, the rigid beam link 606 can interconnect two groups of loop flexures 603.

As those skilled in the art will appreciate, such loop flexures are locally soft in both bending (holding the deployment pad 601 stationary and moving attachment 604 along the y axis and/or the z axis) and extension (holding the deployment pad 601 stationary and moving attachment 604 along the x axis).

By disposing a plurality of loop flexures 603 at each end of the rigid beam link 606, the translation stiffness out-of-plane is reduced substantially (it is now controlled by the bending of each group, which is low). The rotational stiffness about the beam axis is tolerable.

Figure 7:
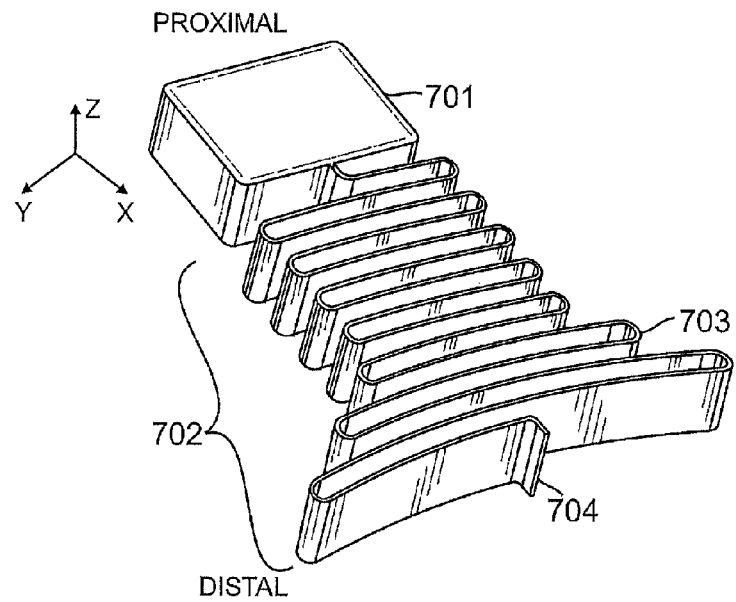
FIG. 7 is a semi-schematic perspective view of a deployment pad and deployment flexure wherein the deployment flexure comprises serpentine flexures, according to an example of an embodiment.

Referring now to FIG. 7, a deployment pad 701 and its associated deployment flexure 702 are shown, according to an example of an embodiment. The deployment pad 701 can be generally rectangular (as shown), square, octagonal, round, or of any other desired shape. The distal end of the deployment flexure 702 defines an attachment point 704, such as where the deployment flexure 702 can attach to a stage.

The deployment flexure 702 can comprise one or more serpentine flexures 703. For example, the deployment flexure 702 can have serpentine flexures 703 formed at either end thereof. The serpentine flexures 703 can be positioned at any desired location along the length of the deployment flexure 702 and can be positioned along the entire length thereof (as shown).

As those skilled in the art will appreciate, such loop flexures are locally soft in all direction (holding the deployment pad 701 stationary and moving attachment 704 along the x axis, the y axis and/or the z axis).

Figure 8:
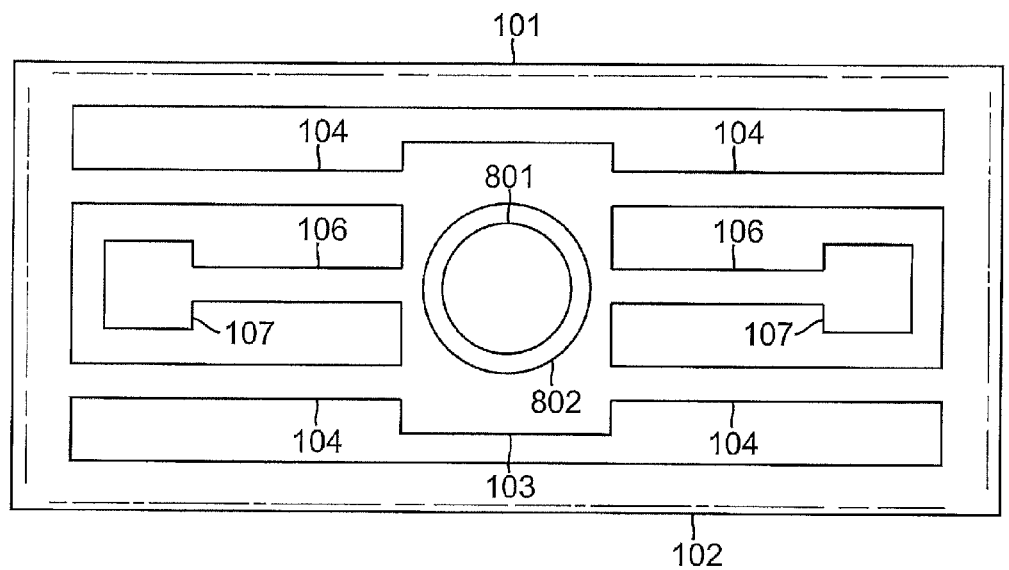
FIG. 8 is a semi-schematic top view of a flexure assembly having a lens attached to the stage thereof, according to an example of an embodiment.
Figure 9:
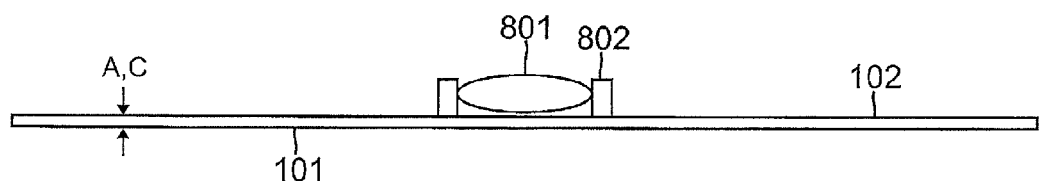
FIG. 9 is a semi-schematic side view of a flexure assembly having a lens attached to the stage thereof, according to an example of an embodiment.

Referring now to FIGS. 8 and 9, an optical element 801, such as lens or lens assembly, mirror, prism, filter, imaging sensor, or spatial light modulator (SLM) can be attached to the stage 103. Any desired device or item (including non-optical elements) can be mounted to or otherwise in mechanical communication with the stage 103 so as to effect movement of the device.

The optical element can be held in position via a mount ring 802, for example. Any desired method for mounting an optical element or other device or item to the stage can be used.

For example, optical element 801 can be a lens assembly for a miniature camera, such as a miniature camera for a cellular telephone. Thus, the stage 103 can move along the z axis (in and out of the plane of the paper) so as to effect focusing of the camera, for example. Movement of the stage 103 can effect focusing, zooming, image stabilization, or any other desired function.

Figure 10:
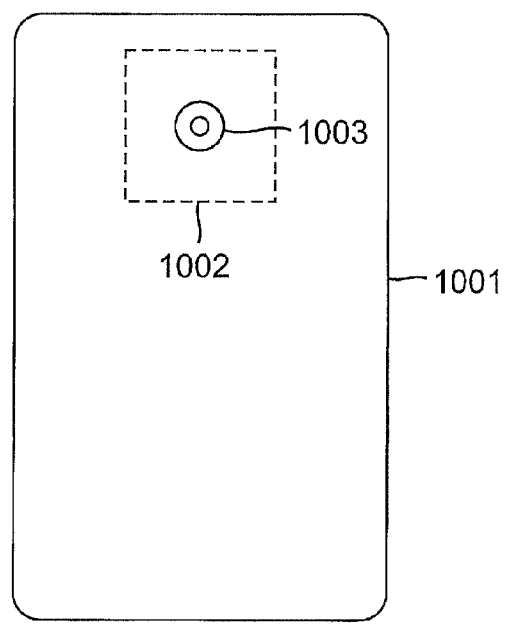
FIG. 10 is a semi-schematic front view of a personal electronic device, such as a cellular telephone, comprising a camera, according to an example of an embodiment.

Referring now to FIG. 10, a camera 1002 having MEMS deployment flexures for facilitating focusing, zooming, and or image stabilization thereof can be built into a cellular telephone 1001, according to an example of an embodiment. The use of MEMS deployment flexures can better facilitate miniaturization and construction of such a camera. The cost of the camera can be substantially reduced and the reliability thereof can be enhanced.

As used herein, the term "housing" can refer to any package, container, product, device, or structure within which and/or to which a flexure assembly can be contained and/or attached.

Embodiments described above illustrate, but do not limit, the invention. It should also be understood that numerous modifications and variations are possible in accordance with the principles of the present invention. Accordingly, the scope of the invention is defined only by the following claims.

The invention claimed is:

1. A method comprising:
   providing a flexure assembly having a frame, a stage, a deployment pad, a motion control flexure that interconnects the frame and the stage, and a deployment flexure that interconnects the stage and the deployment pad;
   providing a housing;
   engaging the housing with the deployment pad; and
   wherein the engaging the housing moves the stage from an undeployed position to a deployed position.

2. The method of claim 1, wherein the deployment flexure is a micro electromechanical systems (MEMS) flexure.

3. The method of claim 1, wherein the deployment flexure is generally planar in configuration prior to engaging the housing with the deployment pad.

4. The method of claim 1, wherein the deployment flexure is deformed by structures of the housing in a manner that moves the stage out-of-plane.

5. The method of claim 1, wherein the deployment flexure is comparatively soft in one degree of freedom and is formed from silicon.

6. The method of claim 1, wherein the deployment flexure and the motion control flexure are comparatively soft in a plurality of degrees of freedom and are formed from silicon.

7. The method of claim 1, wherein the deployment flexure moves the stage from an undeployed position to a deployed position.

8. The method of claim 1, further comprising attaching an optical element to the stage.

9. The method of claim 8, further comprising incorporating the flexure assembly with the housing into a camera, wherein the optical element is disposed along an optical axis of the camera.

10. The method of claim 9, further comprising incorporating the camera into a personal electronic device, and wherein the optical element comprises a lens.

* * * * *